(12) United States Patent
Nakamura

(10) Patent No.: US 12,346,687 B2
(45) Date of Patent: Jul. 1, 2025

(54) INFORMATION PROCESSING APPARATUS, LOG STORAGE METHOD, AND NON-TRANSITORY RECORDING MEDIUM

(71) Applicant: Takafumi Nakamura, Kanagawa (JP)

(72) Inventor: Takafumi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 176 days.

(21) Appl. No.: 18/303,114

(22) Filed: Apr. 19, 2023

(65) Prior Publication Data

US 2023/0376300 A1 Nov. 23, 2023

(30) Foreign Application Priority Data

May 18, 2022 (JP) .................................. 2022-081555

(51) Int. Cl.
 *G06F 9/44* (2018.01)
 *G06F 8/654* (2018.01)

(52) U.S. Cl.
 CPC .................................... *G06F 8/654* (2018.02)

(58) Field of Classification Search
 None
 See application file for complete search history.

(56) References Cited

U.S. PATENT DOCUMENTS

| | | | |
|---|---|---|---|
| 2005/0177709 A1* | 8/2005 | Kim | G06F 8/65 713/1 |
| 2009/0327814 A1* | 12/2009 | Watanabe | G06F 11/366 714/E11.217 |
| 2015/0204912 A1* | 7/2015 | Wade | G01R 31/3842 324/437 |
| 2015/0281093 A1* | 10/2015 | Nishiguchi | H04L 47/125 370/235 |
| 2015/0317103 A1* | 11/2015 | Niwa | G06F 3/1284 358/1.15 |
| 2017/0046152 A1* | 2/2017 | Shih | G06F 11/0727 |
| 2017/0131991 A1* | 5/2017 | Su | G06F 8/66 |
| 2018/0088872 A1* | 3/2018 | Nishimura | G06F 3/1285 |
| 2018/0267793 A1* | 9/2018 | Watanabe | G06F 3/0659 |
| 2019/0095195 A1* | 3/2019 | Lin | G06F 8/654 |
| 2019/0199882 A1* | 6/2019 | Han | H04N 1/00244 |
| 2021/0357202 A1* | 11/2021 | Swirydczuk | G06F 8/654 |
| 2022/0091838 A1* | 3/2022 | Lee | G06F 8/65 |

FOREIGN PATENT DOCUMENTS

| | | |
|---|---|---|
| JP | 2008-217201 | 9/2008 |
| JP | 2017-228010 | 12/2017 |
| JP | 2020-021246 | 2/2020 |
| JP | 2020-136804 | 8/2020 |
| JP | 2020-191121 | 11/2020 |

* cited by examiner

*Primary Examiner* — Bradley A Teets
*Assistant Examiner* — Lanny N Ung
(74) *Attorney, Agent, or Firm* — IPUSA, PLLC

(57) ABSTRACT

An information processing apparatus, a log storage method, and a non-transitory recording medium. The information processing apparatus updates firmware of a controller, updates the firmware of an operation device while the operation device is in operation, and stores a log related to the operation device in the operation device while the firmware of the controller is being updated.

9 Claims, 10 Drawing Sheets

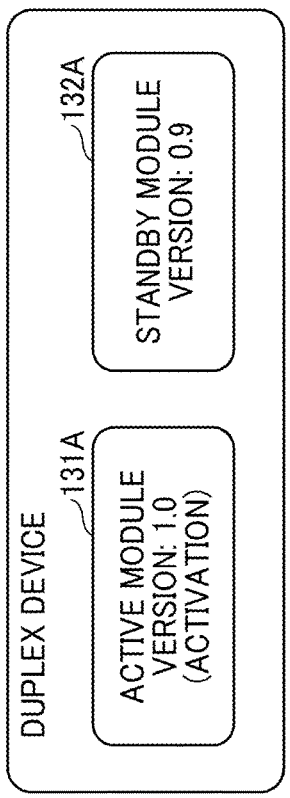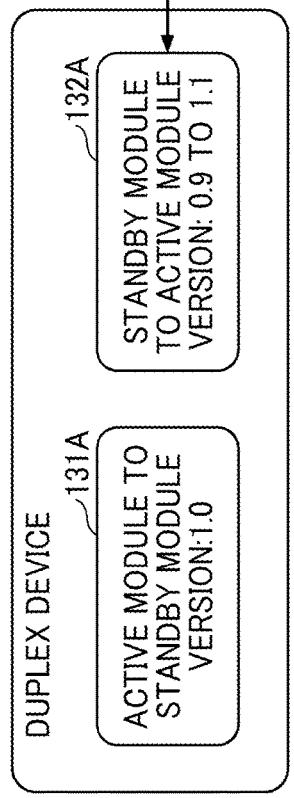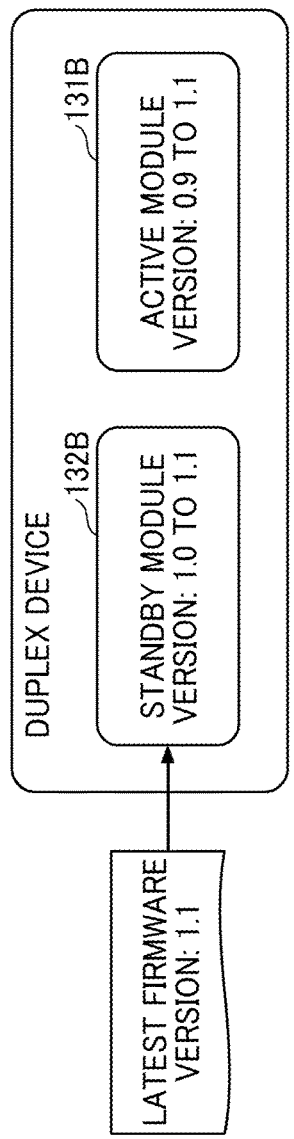

INFORMATION PROCESSING APPARATUS, LOG STORAGE METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-081555, filed on May 18, 2022, in the Japan Patent Office, the entire disclosure of which is hereby incorporated by reference herein.

BACKGROUND

Technical Field

The present disclosure relates to an information processing apparatus, a log storage method, and a non-transitory recording medium.

Background Art

An information processing apparatus such as a multifunction peripheral (MFP) includes multiple functions, executes multiple pieces of firmware for controlling a controller, an operation device, a printer that performs image formation, a facsimile, a finisher, and the like. By updating the firmware in the information processing apparatus used by the user after shipment, the functions of the information processing apparatus are improved even after shipment.

A technique for updating the firmware while continuing to provide service is known. A duplex system is disclosed in which a standby module switches to an active module after updating to latest firmware, and then the active module becomes the standby module, and after updating to the latest firmware, returns to the standby module. In the duplex system, service is continuously provided while the firmware is being updated.

SUMMARY

Embodiments of the present disclosure describe an information processing apparatus, a log storage method, and a non-transitory recording medium. The information processing apparatus updates firmware of a controller, updates the firmware of an operation device while the operation device is in operation, and stores a log related to the operation device in the operation device while the firmware of the controller is being updated.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 4A, 4B, and 4C are diagrams illustrating a firmware update method of an operation device by a seamless update process;

Figure 1:
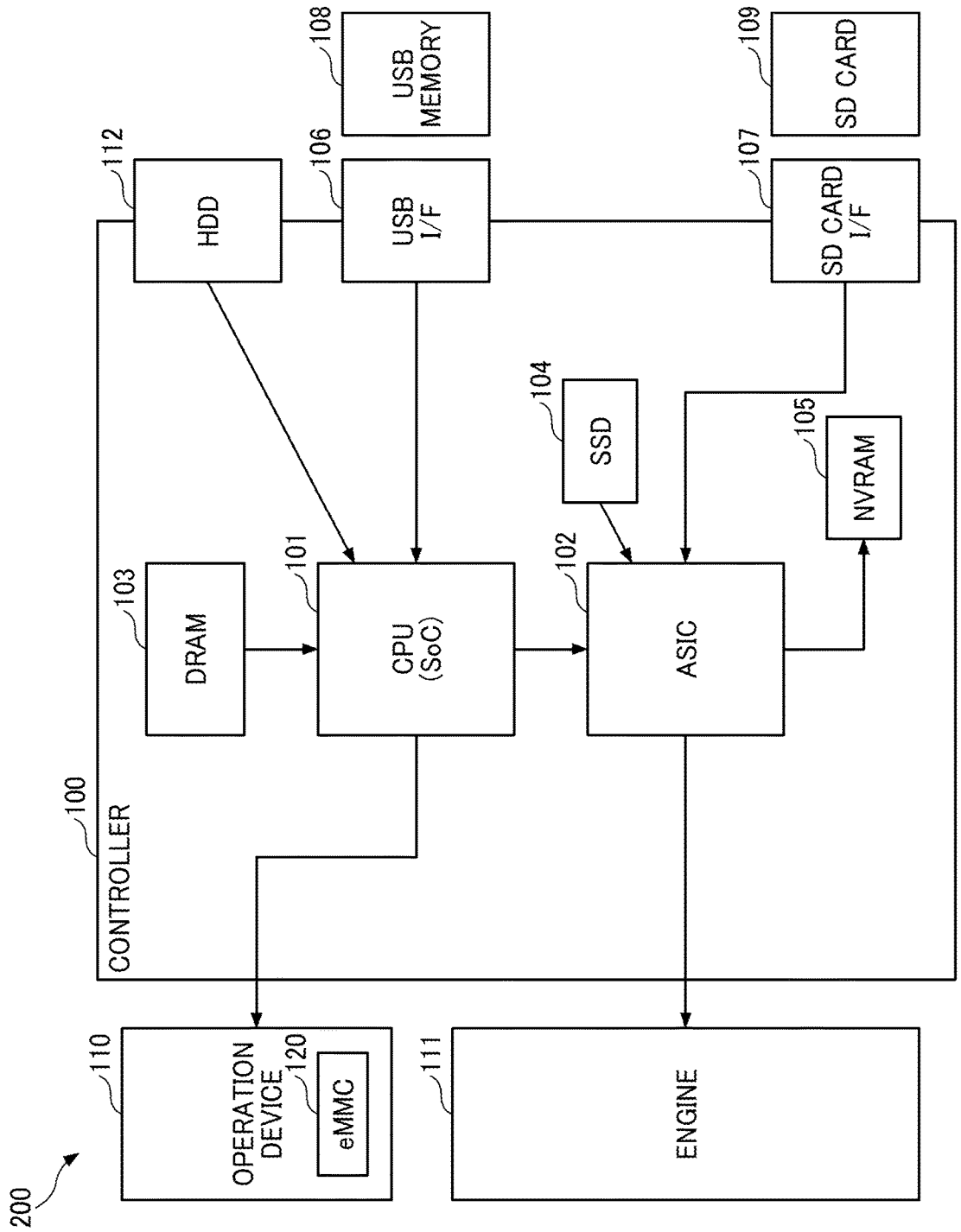
FIG. 1 is a block diagram illustrating an example of a configuration of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An image forming apparatus and a log storage method performed by the image forming apparatus are described below as an example of embodiments of the present disclosure with reference to the drawings.

With reference to FIG. 1, firmware update methods according to several different procedures are described. FIG. 1 is a block diagram illustrating a configuration of an image forming apparatus 200. The image forming apparatus 200 is entirely controlled by a controller 100. The controller 100 includes a central processing unit (CPU) 101, an application specific integrated circuit (ASIC) 102, a dynamic random access memory (DRAM) 103, a solid state drive (SSD) 104, a non-volatile random access memory (NVRAM) 105, a secure digital (SD) card interface (I/F) 107, a Universal Serial Bus (USB) I/F 106 and a hard disk drive (HDD) 112. An SD card 109 is attached to the SD card I/F 107 and a USB memory 108 is attached to the USB I/F 106.

The controller 100 is connected to an operation device 110 and an engine 111 through serial interfaces such as USB cables. The operation device 110 includes a touch panel and a keyboard, displays an operation screen, and receives input from a user. The engine 111 performs processing related to functions of the image forming apparatus 200, such as a print function, a scan function, and a facsimile function.

The operation device 110 includes an embedded Multimedia Card (eMMC) 120 and the controller 100 includes the HDD 112. The eMMC 120 stores an operating system (OS), firmware, and application of the operation device 110. The HDD 112 stores the OS and firmware of the controller 100.

As described above, the firmware is operated on different OSs of the operation device 110 and the controller 100. The operation device 110 and the controller 100 are devices independent of each other, and the operation device 110 displays the operation screen and receives input from the user independently from the controller 100. The HDD 112 is provided on the controller 100 since the HDD 112 having a large capacity and resistance to failure is preferable for storing data such as print data. On the other hand, since the operation device 110 mainly serves as an interface for the user, the eMMC 120 having excellent reading and writing speed for ensuring operability is preferrable. However, the controller 100 may be equipped with the SSD or eMMC, or the operation device 110 may be equipped with the SSD or HDD.

A following first procedure is conceivable in which the image forming apparatus 200 updates the firmware of the operation device 110 and the controller 100, respectively.
 (1) The user instructs the controller 100 to update the firmware. The user may instruct update through a network from a terminal device such as a personal computer (PC), or may operate the operation device 110 to instruct the update.
 (2) The user copies a compressed file (referred to as a package) including the firmware for the operation device 110 and the controller 100 to the HDD 112. The user may download the compressed file from the network, or copy from the SD card or the like.
 (3) The OS of the controller 100 copies the package, and then decompresses and stores the package in the HDD 112.
 (4) The OS of the controller 100 updates the firmware of the controller 100 using the decompressed file.
 (5) After the update is completed, the OS of the controller 100 transfers the firmware of the operation device 110 and the application from the HDD 112 to the eMMC 120 of the operation device 110.
 (6) The operation device 110 first updates the application.
 (7) After the application is updated, the operation device 110 restarts in a mode dedicated to updating called a recovery mode (unnecessary modules are not operated and user operation is disabled).
 (8) In the recovery mode, the OS of the operation device 110 updates the firmware of the operation device 110.
 (9) After the firmware is updated, the OS of the operation device 110 is restarted again with the new firmware of the operation device 110.

According to the first procedure, the update of the firmware of the controller 100 and the update of the firmware of the operation device 110 are sequentially performed.

A second procedure for updating the firmware of the controller 100 and updating the firmware of the operation device 110 in parallel is described in the following.
 (1) The user instructs the controller 100 to update the firmware. The user may instruct the update through the network from the terminal device such as the PC, or may operate the operation device 110 to instruct the update.
 (2) The user copies the compressed file (package) including the firmware of the operation device 110 and the controller 100 to the HDD 112. The user may download the compressed file from the network, or copy from the SD card or the like.
 (3) The OS of the controller 100 copies the package, and then decompresses and stores the package in the HDD 112.
 (4) The OS of the controller 100 transfers the firmware and application of the operation device 110 from the HDD 112 to the eMMC 120 of the operation device 110.
 (5) After the transfer is completed, the OS of the controller 100 notifies the operation device 110 of the start of the update of the controller 100.
 (6) The controller 100 updates the firmware of the controller 100 using the decompressed file.
 (7) In parallel with the update of the firmware of the controller 100, the operation device 110 updates the firmware of the operation device 110 by a method of updating the firmware while the operation device 110 is in operation (seamless update method). The operation device 110 is able to receive operation by the user even while the firmware is being updated.
 (8) The operation device 110 also updates the applications in parallel with the firmware update.
 (9) After updating the firmware of the controller 100, the controller 100 notifies the operation device 110 that the update of the controller 100 is completed.
 (10) After the firmware update of the operation device 110 is completed, the OS of the operation device 110 is restarted and the new firmware of the operation device 110 is activated.

According to the second procedure, update of the application of the operation device 110, the firmware update of the operation device 110, and the firmware update of the controller 100 are performed in parallel, and time for update is reduced. As a result, time for updating a plurality of pieces of firmware is rate-determined to the longest time among the firmware of the controller 100, the firmware of the operation device 110, and the application of the operation device 110.

Here, since seamless update is employed in the second procedure, the operation device 110 receives user operation even while updating the firmware or application of the operation device 110 described in steps (6) to (8) of the second procedure. In the first procedure, the operation device 110 shifts to the recovery mode so that unnecessary modules are not operated, and user operation is disabled.

However, in the second procedure, the seamless update allows the user to perform the operation that does not use the functions of the controller 100 even when the update of the controller 100 is not completed. In addition, since the update of the controller 100 is not completed, a user operation log and a malfunction log of the operation device 110 are not stored (since the logs of the operation device 110 are to be stored in the HDD of the controller 100).

In the present embodiment, in response to receiving an update start notification from the controller 100, the operation device 110 after restart, stores the log of the operation device 110 in the eMMC 120 by a log storage process during package update. Accordingly, the operation device 110 stores the log of user operation and the log of malfunction in the operation device 110, even in the case the update of the controller 100 is not completed during the period from restart of the operation device 110 until completion of the update of the controller 100.

On the other hand, capacity of the eMMC 120 in the operation device 110 is limited. Since the capacity of the eMMC 120 is not as large as that of the HDD of the controller 100, for example, the storage size may be limited to 256 KB, and in the case the upper limit is exceeded, the oldest record in the log is deleted (or overwritten) and a new record is stored. Accordingly, capacity shortage of the eMMC 120 due to an increase of the log may be prevented, and the log can be stored without attaching a sub-storage or the like to the operation device 110.

After the operation device 110 stores the log in the eMMC 120, in response to receiving an update completion notification from the controller 100, the operation device 110 stops storing the package updating log and deletes the log stored in the eMMC 120 after transmission to the controller 100 since communication is established between the controller 100 and the operation device 110. As a result, an administrator is able to check the log during package update and the log during normal startup after the update as a series of logs.

The "firmware" is a type of software built into information processing apparatuses, electronic devices, and the like, and is a program that implements basic control of internal circuits and devices. The firmware is fixedly installed inside the device and is closely linked to the internal hardware. The word "firm" is used since as a general rule, the content does not change during normal use or operation. The firmware is sometimes referred to as a program for the system because of basic control functions that the firmware includes.

The "firmware update" refers to updating the firmware (upgrading the version). The firmware update includes installing a new firmware.

The term "while operating the operation device" indicates that the operation device is activated and ready to be operated by the user.

The "downtime" is the time during which the user is restricted from using the information processing apparatus.

A "log" refers to recording history and information such as usage status of an information processing apparatus and data communication, and the recorded information thereof. The date and time when an operation is performed or when data was sent and received, content of the operation performed, content of the data sent and received, etc. are recorded.

Figure 2:
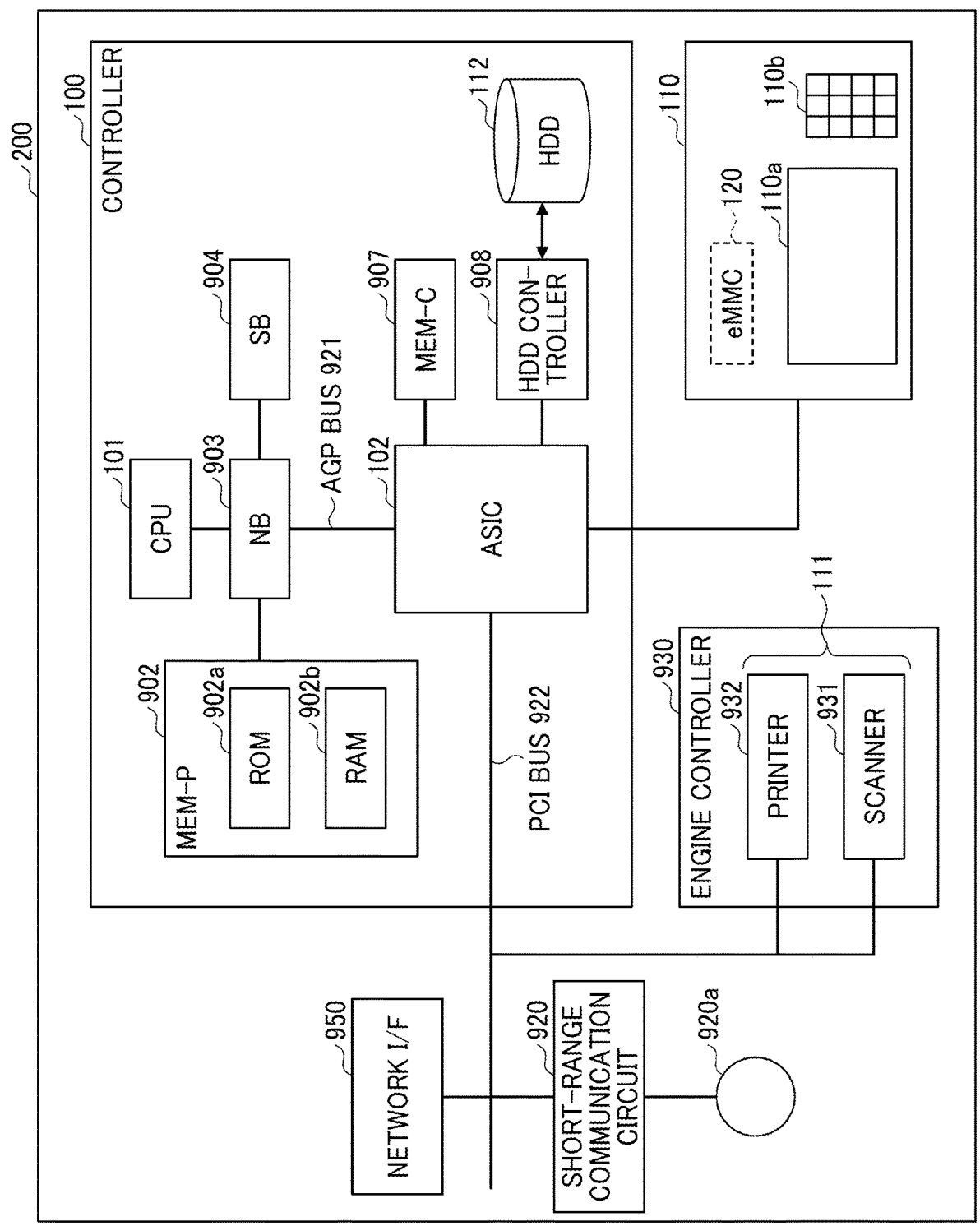
FIG. 2 is a block diagram illustrating an example of a hardware configuration of the image forming apparatus.

FIG. 2 is a block diagram illustrating a hardware configuration of the image forming apparatus 200. The image forming apparatus 200 is an example of an information processing apparatus. The image forming apparatus 200 illustrated in FIG. 2 presents a detailed configuration in addition to the configuration illustrated in FIG. 1. In FIG. 2, some parts of the configuration of FIG. 1 is omitted.

As illustrated in FIG. 2, the image forming apparatus 200 includes the controller 100, a short-range communication circuit 920, an engine controller 930, the operation device 110 and a network I/F 950.

The controller 100 includes the CPU 101 as a main processor, a system memory (MEM-P) 902, a north bridge (NB) 903, a south bridge (SB) 904, the ASIC 102, a local memory (MEM-C) 907 as a storage unit, an HDD controller 908, and the HDD 112 as another storage unit. The NB 903 and the ASIC 102 are connected through an Accelerated Graphics Port (AGP) bus 921.

Among the components described above, the CPU 101 is a control unit that performs overall control of the image forming apparatus 200.

The NB 903 connects the CPU 101 with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a read only memory (ROM) 902a as a memory that stores program and data for implementing various functions of the controller 100. The MEM-P 902 further includes a RAM 902b as a memory that deploys the program and data, or as a drawing memory that stores drawing data for printing. The program stored in the ROM 902a may be stored in any computer-readable storage medium, such as a compact disc (CD), digital versatile disc (DVD), or BLU-RAY (registered trademark) in a file format installable or executable by the computer for distribution.

The SB 904 is a bridge for connecting the NB 903 with a peripheral component interconnect (PCI) device or a peripheral device. The ASIC 102 is an integrated circuit (IC) dedicated to an image processing use, and connects the AGP bus 921, a PCI bus 922, the HDD controller 908, and the MEM-C 907 as a bridge. The ASIC 102 includes a PCI target, an AGP master, an arbiter (ARB) as a central processor of the ASIC 102, a memory controller for controlling the MEM-C 907, a plurality of direct memory access controllers (DMACs) capable of converting coordinates of image data with a hardware logic, and a PCI unit that transfers data between a scanner 931 and a printer 932 through the PCI bus 922. The ASIC 102 may include a USB interface or an Institute of Electrical and Electronics Engineers (IEEE) 1394 interface.

The MEM-C 907 is a local memory used as a buffer for image data to be copied or a code buffer. The HDD 112 is a storage that stores image data, font data used during printing, and forms. The HDD controller 908 controls reading or writing of data to and from the HDD 112 under the control of the CPU 101. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920a. The short-range communication circuit 920 is a communication circuit that communicates in compliance with Near Field Communication (NFC), BLUETOOTH (registered trademark) and the like.

The engine controller 930 includes a scanner 931 and a printer 932. The operation device 110 includes a display panel 110a such as a touch panel for displaying current setting values, selection screens, and the like, and for receiving input from the operator. The operation device 110 also includes hard keys 110b including a numeric keypad for receiving setting values of conditions related to image formation such as density setting conditions, a start key for receiving a copy start instruction, and the like. The controller 100 controls the entire image forming apparatus 200, and controls, for example, drawing, communication, input from the operation device 110, and the like. The scanner 931 or the printer 932 includes image processing functions such as error diffusion processing and gamma conversion processing.

Note that the image forming apparatus 200 is able to switch and select a document box function, a copy function, a print function, and a facsimile function in sequence using an application switching key of the operation device 110. In the image forming apparatus 200, a document box mode is selected when the document box function is selected, a copy mode is selected when the copy function is selected, a print mode is selected when the print function is selected, and a facsimile mode is selected when the facsimile function is selected.

The network I/F 950 is an interface for performing data communication using a network. The short-range communication circuit 920 and network I/F 950 are electrically connected to the ASIC 102 through the PCI bus 922.

Figure 3:
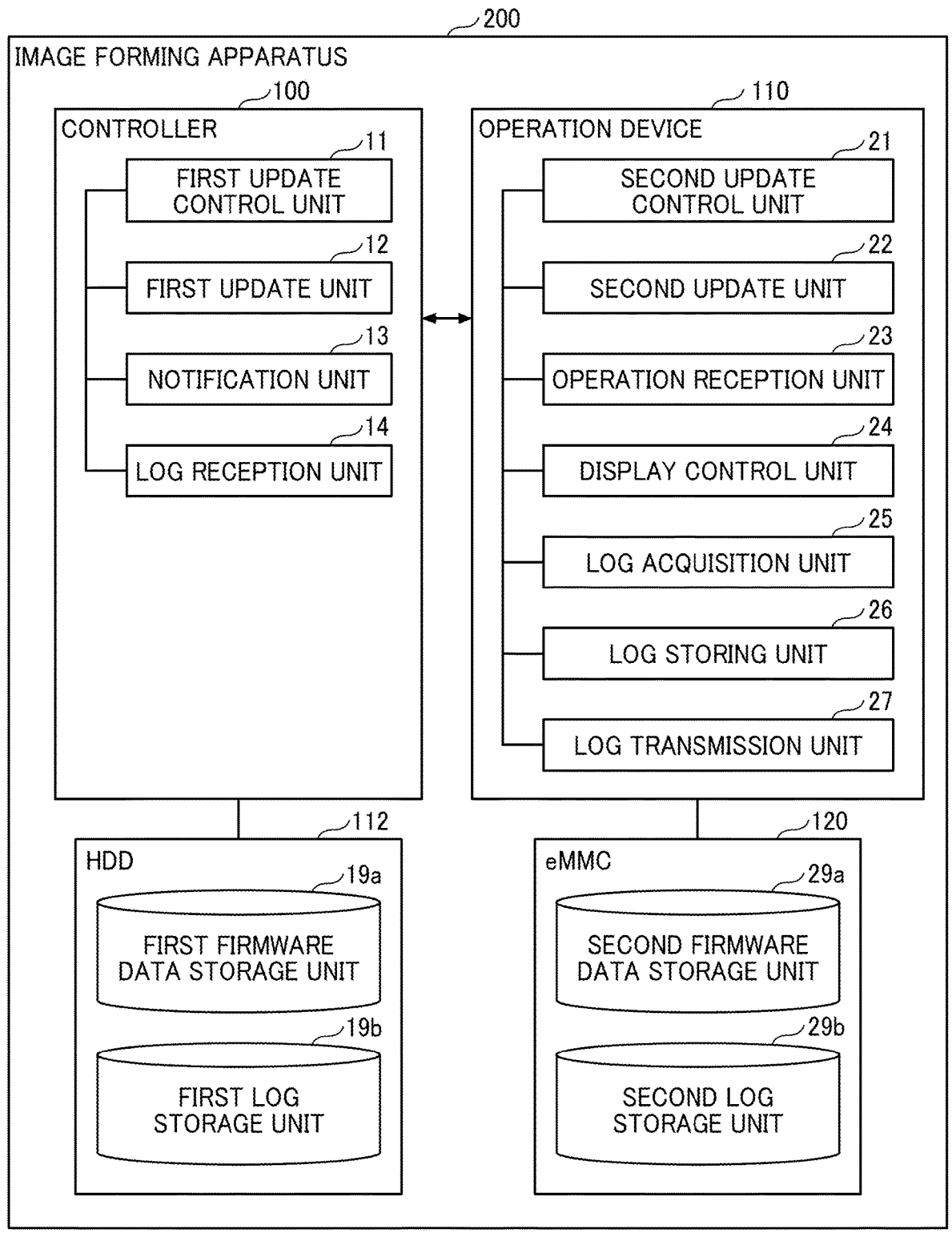
FIG. 3 is a block diagram illustrating an example of a functional configuration of the image forming apparatus related to firmware update.

With reference to FIG. 3, a description is given of a functional configuration of the image forming apparatus 200. FIG. 3 is a block diagram illustrating an example of a functional configuration of the image forming apparatus 200 related to the firmware update. The controller 100 of the image forming apparatus 200 includes a first update control unit 11, a first update unit 12, a notification unit 13 and a log reception unit 14. Each of these functional units of the controller 100 is implemented by operating any one of the elements illustrated in FIG. 2 according to instructions from the CPU 101 in accordance with the OS or program developed from the HDD 112 to the RAM 902b.

The first update control unit 11 performs a control of the firmware update process on the controller 100. The "control of the firmware update process" is to update the firmware of the controller 100 and to request the operation device 110 to update the firmware according to the second procedure described above.

The first update unit 12 updates the firmware of the controller 100 using the firmware of the controller 100 stored in the first firmware data storage unit 19a.

The notification unit 13 notifies the operation device 110 from the controller 100 when the controller 100 starts updating the controller firmware and when the update is completed.

The log reception unit 14 receives from the operation device 110 the log that the operation device 110 stored while the controller 100 was updating the firmware. The log reception unit 14 stores the received log together with the log recorded by the controller 100 in chronological order in the first log storage unit 19b. In this way, the image forming apparatus 200 stores the log of the operation device 110 stored while the firmware of the controller 100 is being updated in chronological order with the log collected while the firmware is not being updated.

The first firmware data storage unit 19a and the first log storage unit 19b are implemented in the HDD 112 of the image forming apparatus 200. The first firmware data storage unit 19a stores the compressed file (referred to as the package) including the firmware of the operation device 110 (application and firmware) and the controller 100. After the package is decompressed, the application and firmware of the operation device 110 and the firmware of the controller 100 are stored in the first firmware data storage unit 19a. The firmware may be downloaded by the user from the network or copied from the SD card or the like.

The logs of events occurred in the controller 100 and the operation device 110 are stored in the first log storage unit 19b. The events may include various events related to processing, such as operation performed, job registration, job execution, error, and content of communication. The log may include identification information of the event, date and time of occurrence, user ID involved in the operation, and the like. In the first log storage unit 19b, the logs of events occurred in the controller 100 and in the operation device 110 are stored. However, while the firmware of the controller 100 is being updated, the operation device 110 temporarily stores the log of the operation device 110 in the second log storage unit 29b.

The operation device 110 of the image forming apparatus 200 includes a second update control unit 21, a second update unit 22, an operation reception unit 23, a display control unit 24, a log acquisition unit 25, a log storing unit 26, and a log transmission unit 27. Each of these functional units of the operation device 110 is implemented by operating any one of the elements illustrated in FIG. 2 according to instructions from the CPU of the operation device 110 in accordance with the OS or program of the operation device 110 stored in the eMMC 120.

The second update control unit 21 controls the firmware update process of the operation device 110. The seamless update process in which the firmware is updated while the operation device 110 is operating is used for updating the operation device 110. Details are described below with reference to FIG. 4.

The second update unit 22 updates the application and firmware of the operation device 110 using the application (for updating) and firmware of the operation device 110 stored in the second firmware data storage unit 29a (transferred from the controller 100).

The operation reception unit 23 receives various operations on the operation device 110. In addition, the operation reception unit 23 restricts user operations from the time when the controller 100 receives a notification indicating that the firmware update is started until a notification indicating that the update is completed (hereinafter referred to as a restricted period) is received.

The operation reception unit 23 receives operations that do not use the functions of the controller 100 during the restricted period.

The display control unit 24 displays a message indicating that available functions are limited during the restricted period, the remaining time for update, and the like. Further, in response to receiving an operation by the user on the operation device 110 to use the function of the controller 100 during the restricted period, the display control unit 24 displays a message indicating that the function is temporarily unavailable.

The log acquisition unit 25 acquires logs (generates logs) based on events occurred in the operation device 110. The log acquisition unit 25 acquires the content of the event, the current date and time from a real time clock (RTC), the logged-in user, the state of the operation device 110, and the like, and generates a log.

The log storing unit 26 temporarily stores a log of events occurring in the operation device 110 during the firmware update of the controller 100 in the second log storage unit 29b. The operation device 110 performs processing even while the firmware of the operation device 110 is being updated by the seamless update process. The log is stored after the operation device is restarted after the firmware update.

The log storing unit 26 deletes (or overwrites) the log from the second log storage unit 29b and stores the latest log when the size of the log reaches a threshold value or more (for example, 256 KB or more).

The log transmission unit 27 transmits the log of the operation device 110 stored in the second log storage unit 29b to the controller 100 after the firmware update of the controller 100 is completed.

The log storing unit 26 deletes the transmitted log from the second log storage unit 29b.

Further, the eMMC 120 of the operation device 110 includes a second firmware data storage unit 29a and a second log storage unit 29b. The application and firmware of the operation device 110 transferred from the controller 100 are stored in the second firmware data storage unit 29a. The logs of events occurred in the operation device 110 during the firmware update of the controller 100 are temporarily stored in the second log storage unit 29b.

With reference to FIGS. 4A, 4B, and 4C, the seamless update process is described in the following. FIGS. 4A, 4B, and 4C are diagrams illustrating a process of updating the firmware of the operation device 110 by the seamless update process using a duplex device or duplex system. Duplex is a method of preparing two systems of components or systems having equivalent functions to improve reliability and fault tolerance. The duplex device or system is able to update the firmware without stopping service.

As illustrated in FIG. 4A, multiple modules are installed in the operation device 110. One module is called an active module 131A, and the other module is called a standby module 132A. Both the active module 131A and the standby module 132A are functionally equivalent system modules implemented by firmware. The operation device 110 is the duplex device or duplex system with equivalent modules.

The active module 131A and the standby module 132A are alternately replaced. The module that is updated first becomes the active module, and the module that is updated later becomes the standby module. Although there are two modules in FIG. 4A, there may be three or more modules. The firmware versions of the active module 131A and the standby module 132A before updating are as follows.

Active module 131A: version 1.0
Standby module 132A: version 0.9

The seamless update process enables the firmware update of the operation device 110 while the operation device 110 is operable for the user. Therefore, when the operation device 110 is activated, the operation device 110 activates the active module 131A with the new firmware version. In FIG. 4A, the active module 131A (an example of first firmware) is activated.

In updating the firmware of the operation device 110, the second update unit 22 updates in background, the standby module 132A (an example of second firmware) that is not activated, as illustrated in FIG. 4B. The "background" refers to processing while giving priority to the execution of the application (while ensuring the execution of the application).

The version of the standby module 132A is updated as follows.

Standby module 132A: Version 0.9 to 1.1

After updating the firmware, the second update unit 22 switches the active module 131A to the standby module 132B, and switches the standby module 132A to the active module 131B.

Then, when the operation device 110 is activated next time, the active module 131B is activated. As illustrated in FIG. 4C, while the active module 131B is operating, the second update unit 22 updates in the background, the standby module 132B that is not activated.

The version of the standby module 132B is updated as follows.

Standby module 132B: Version 1.0 to 1.1

Note that the second update unit 22 may or may not switch the role of the module after the firmware update.

As a result, the operation device 110 updates the firmware without downtime.

Figure 5:
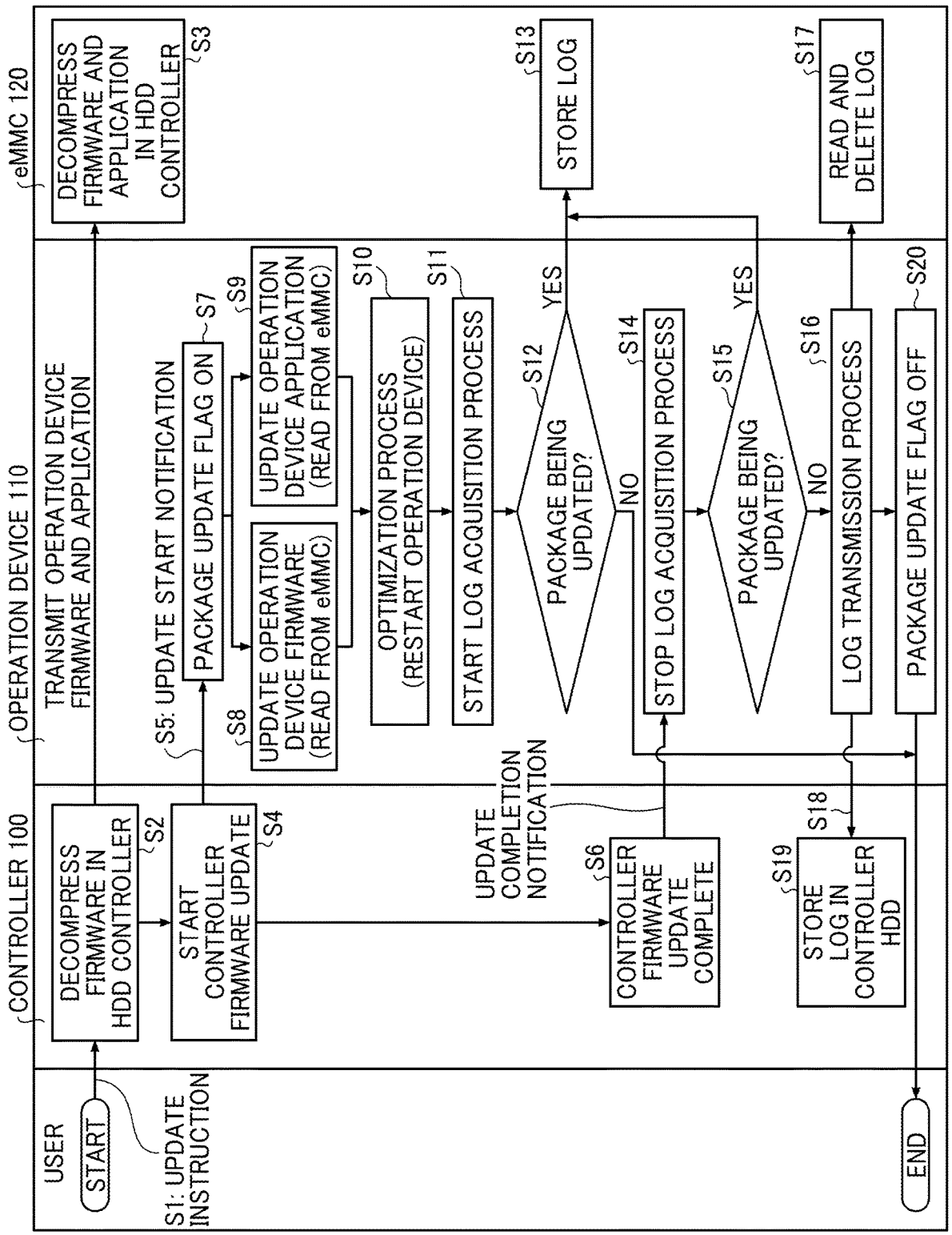
FIG. 5 is a sequence diagram illustrating a process in which a controller and the operation device update the firmware in parallel.

With reference to FIG. 5, a process of the firmware update executed by the image forming apparatus 200 is described. FIG. 5 is a flowchart illustrating the operation or process of updating the firmware in parallel by the controller 100 and the operation device 110.

In step S1, the user instructs the controller 100 to update the firmware. The user may instruct the update through the network from the terminal device such as the PC, or may operate the operation device 110 to instruct the update. FIG. 5 illustrates a case in which instruction is made through the network. The compressed file containing the application and firmware of the operation device 110 and the firmware of the controller 100 is already stored in the HDD 112 (first firmware data storage unit 19a). The user may download the compressed file from the network, or copy from the SD card or the like.

In step S2, the first update control unit 11 of the controller 100 decompresses the package in the first firmware data storage unit 19a.

In step S3, the first update control unit 11 transmits the application and firmware of the operation device 110 to the operation device 110. As a result, the application and firmware of the operation device 110 are stored in the second firmware data storage unit 29a of the eMMC 120.

After completing the transmission, the first update control unit 11 starts updating the firmware of the controller 100 in step S4. The first update control unit 11 causes the first update unit 12 to update the firmware of the controller 100. The first update unit 12 starts updating old firmware using the firmware of the controller 100 stored in the first firmware data storage unit 19a.

In step S5, the notification unit 13 of the controller 100 notifies the operation device 110 of the start of the update of the controller 100.

In step S6, in response to a completion of the firmware update by the first update unit 12, the notification unit 13 notifies the operation device 110 that the update of the controller 100 is completed. At this point, the update of the application and the firmware of the operation device 110 may be completed or continuing. In FIG. 5, the time to update the firmware of the operation device 110 and the application is shorter than the time to update the firmware of the controller 100, but this relationship may be reversed.

In step S7, in response to receiving the update start notification, the display control unit 24 of the operation device 110 starts displaying an update banner screen 210 described below. Further, the update start notification causes the second update control unit 21 to turn on a package update flag. While the package update flag is on, the application of the operation device 110 and the firmware are updated in parallel. In parallel with the firmware update by the first update unit 12, the second update control unit 21 of the operation device 110 causes the second update unit 22 to update the firmware and the application while the operation device 110 is kept operable. Accordingly, the first update unit 12 and the second update unit 22 update the firmware in parallel at least part of the time.

In step S8, the second update unit 22 updates the firmware of the operation device 110 according to the seamless update process described above.

In step S9, the second update unit 22 updates the application in parallel with updating the firmware of the operation device 110.

In step S10, in response to completion of the update of the firmware and the application of the operation device 110, the second update control unit 21 restarts the operation device 110. Restarting causes optimization such as deleting unnecessary files and caches, and defragmentation.

In step S11, upon restarting, the log acquisition unit 25 starts acquiring the log of events occurred in the operation device 110.

In step S12, in response to an occurrence of an event, the log storing unit 26 determines whether the firmware of the controller 100 is being updated (whether the package update flag is on).

In step S13, in the case the firmware of the controller 100 is being updated (when the package update flag is on), the log storing unit 26 stores the log in the second log storage unit 29b of the eMMC 120. The log storing unit 26 deletes or overwrites the oldest record in the log in case the size of the log stored in the second log storage unit 29b exceeds the threshold.

In step S14, in response to receiving an update completion notification, the log storing unit 26 ends storing the log of events occurred in the operation device 110 in the eMMC 120.

In step S15, in response to an occurrence of an event, the log storing unit 26 determines whether the firmware of the controller 100 is being updated (whether the package update flag is on). In response to determination that the firmware of the controller 100 is being updated, the log storing unit 26 stores the log in the second log storage unit 29b of the eMMC 120, as in step S13.

In response to determination that the firmware of the controller 100 is not being updated, the log transmission unit 27 transmits the log temporarily stored in the second log storage unit 29b of the eMMC 120 in step S16.

In step S17, the log transmission unit 27 reads (acquires) the log from the second log storage unit 29b, and deletes the log in the second log storage unit 29b after transmission to the controller 100.

In step S18, the log transmission unit 27 transmits to the controller 100 the log read from the second log storage unit 29b. Next, the log transmission unit 27 transmits the log of a newly occurred event to the controller 100.

In step S19, the log reception unit 14 of the controller 100 receives the log and stores the received log in the first log storage unit 19b in chronological order together with the log stored in the controller 100.

In step S20, in response to completion of the transmission of the log in step S16, the second update control unit 21 turns off the package update flag.

As described above, according to the process of FIG. 5, the operation device 110 stores the log while the controller 100 is updating the firmware, and after the firmware update of the controller 100 is completed, the controller 100 stores the log generated by the operation device 110.

Figure 6:
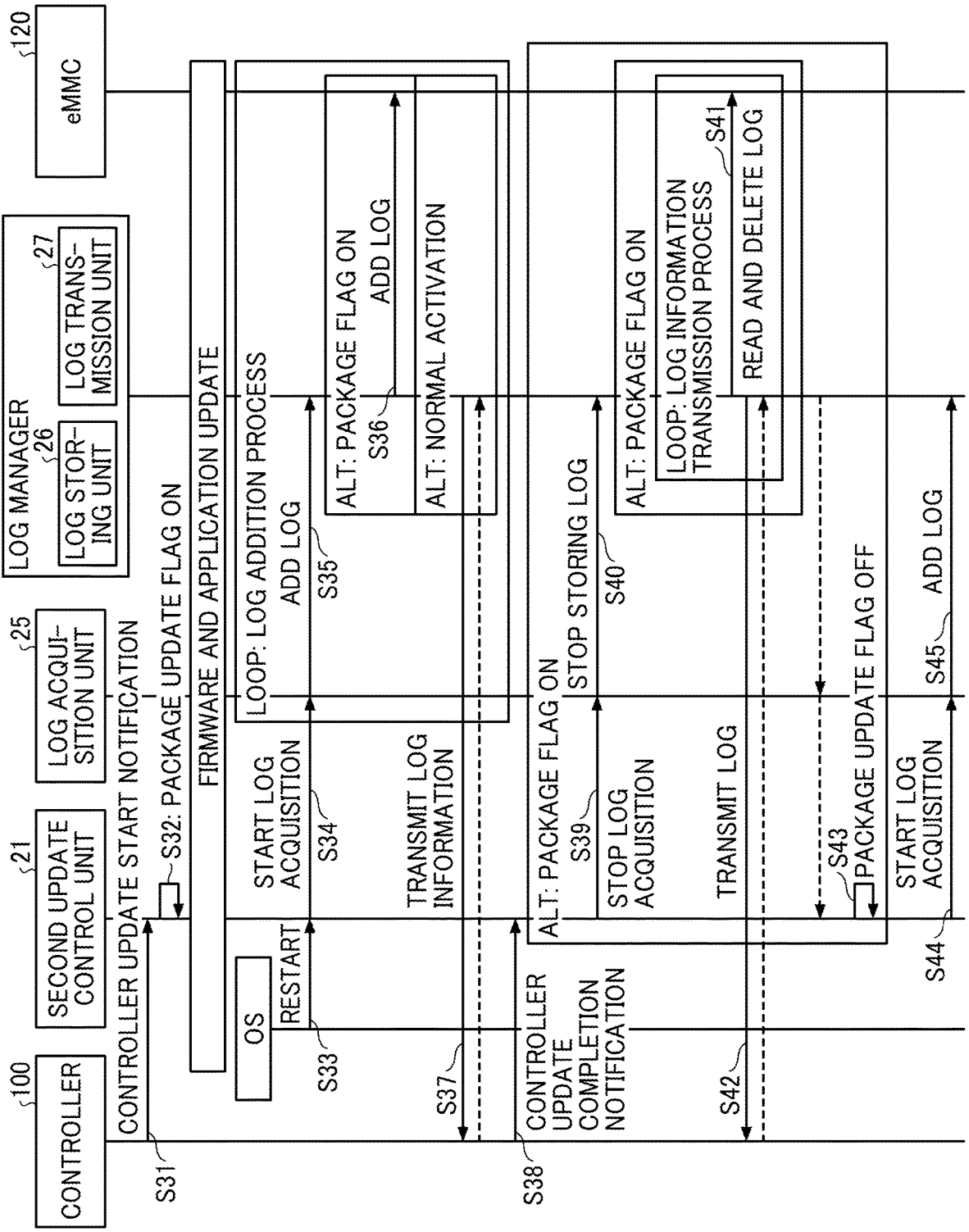
FIG. 6 is a sequence diagram illustrating a process in which the operation device processes a log according to a package update flag.

With reference to FIG. 6, details of a log storage process is described. FIG. 6 is a sequence diagram illustrating a process in which the operation device processes the log according to the package update flag.

In step S31, the controller 100 starts updating the firmware, and the notification unit 13 notifies the operation device 110 of the start of update.

In step S32, the second update control unit 21 of the operation device 110 turns on the package update flag. As described with reference to FIG. 5, the firmware and applications are updated in the operation device 110.

In step S33, in response to completion of the update of the firmware and application of the operation device 110, the operation device 110 is restarted.

In step S34, the second update control unit 21 of the operation device 110 instructs the log acquisition unit 25 to start log acquisition.

In step S35, the log acquisition unit 25 notifies a log manager (the log storing unit 26 and the log transmission unit 27) of the log regarding the event that occurred.

In step S36, in the case the package update flag is on (the controller 100 is being updated), the log storing unit 26 stores the log in the eMMC 120 (second log storage unit 29b).

In step S37, in the case the package update flag is off (the controller 100 is not being updated), the log transmission unit 27 transmits the log to the controller 100.

In step S38, the controller 100 completes updating the firmware, and the notification unit 13 notifies the operation device 110 of the completion of update.

In step S39, in the case the package update flag is on, the second update control unit 21 notifies the log acquisition unit 25 to stop the log acquisition.

In step S40, the log acquisition unit 25 notifies the log manager to stop storing the log.

In step S41, in the case the package update flag is on, the log transmission unit 27 transmits the log stored in the eMMC 120 (second log storage unit 29b) to the controller 100. The log transmission unit 27 reads (acquires) the log from the second log storage unit 29b. Note that the log storing unit 26 deletes the log in the second log storage unit 29b after transmission.

In step S42, the log transmission unit 27 transmits the read log to the controller 100.

In step S43, in response to the completion of the transmission of the log, the second update control unit 21 turns the package update flag off.

A normal (state in which the firmware is not being updated) log storage process is performed thereafter.

In step S44, the second update control unit 21 of the operation device 110 instructs the log acquisition unit 25 to start the log acquisition.

In step S45, the log acquisition unit 25 notifies the log manager of the log regarding the occurred event.

Figure 7:
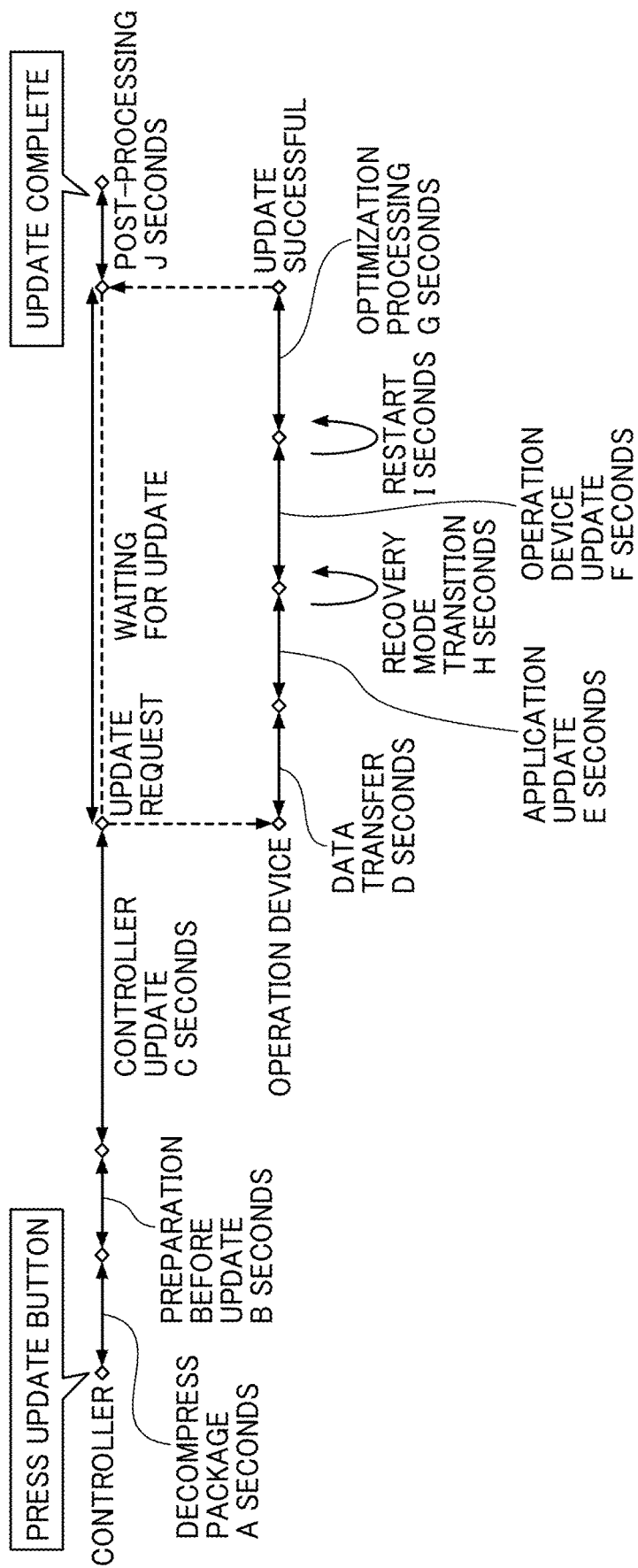
FIG. 7 is a diagram illustrating an example of downtime in a case of a sequential update method employed in a first procedure.

An example of reducing downtime by the firmware update process of the present embodiment is described with reference to FIGS. 7 and 8. FIG. 7 is a diagram illustrating an example of downtime in a case of a sequential update method employed in the first procedure. In FIG. 7, the downtime is the following time from the start of the firmware update.

decompress package: A seconds
    preparation before update: B seconds
    controller update: C seconds
    data transfer: D seconds
    application update: E seconds
    operation device update: F seconds
    optimization processing: G seconds
    recovery mode transition: H seconds
    restart: I seconds
    post-processing: J seconds As illustrated in FIG. 7, after updating the firmware of the controller 100, the firmware of the operation device 110 is updated, and the total downtime is the sum of A second to J second.

Figure 8:
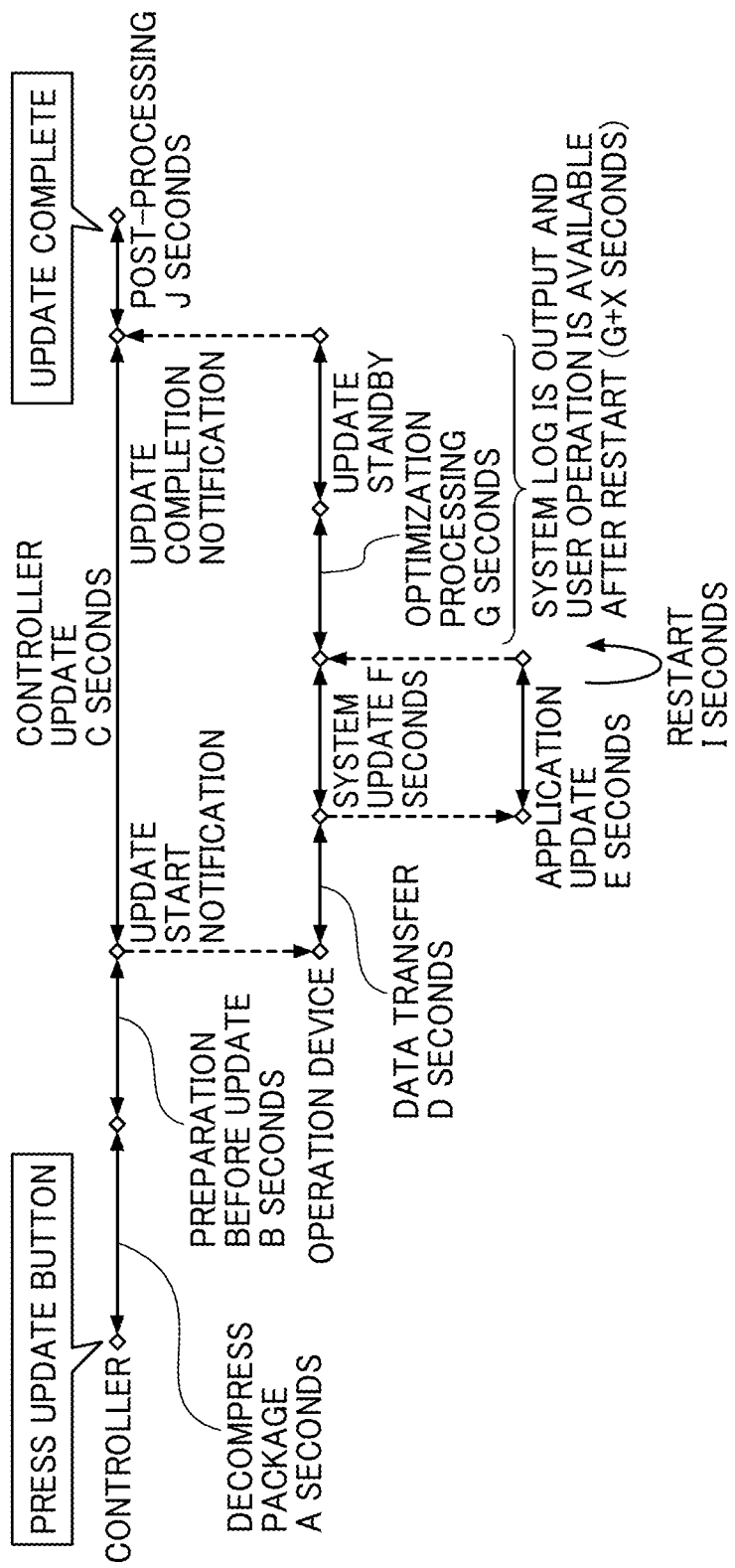
FIG. 8 is a diagram illustrating an example of downtime in a case of a parallel update method employed in a second procedure.

FIG. 8 is a diagram illustrating an example of downtime in a case of a parallel update method employed in the first procedure. The difference from FIG. 7 is that the operation device 110 starts updating the application and the firmware after receiving the update start notification from the controller 100, indicating that the application and firmware are updated in parallel, and that there is no recovery mode transition.

In FIG. 8, the update on the controller 100 takes the longest time, so the downtime is shortened by D+E+F+G+H+I seconds. In the figure, the difference between C seconds to update the controller 100 and D+E+F+G+H+I seconds is X seconds.

Also, after the operation device 110 is restarted, the log is stored, and user operation is received for G+X seconds.

Figure 9:
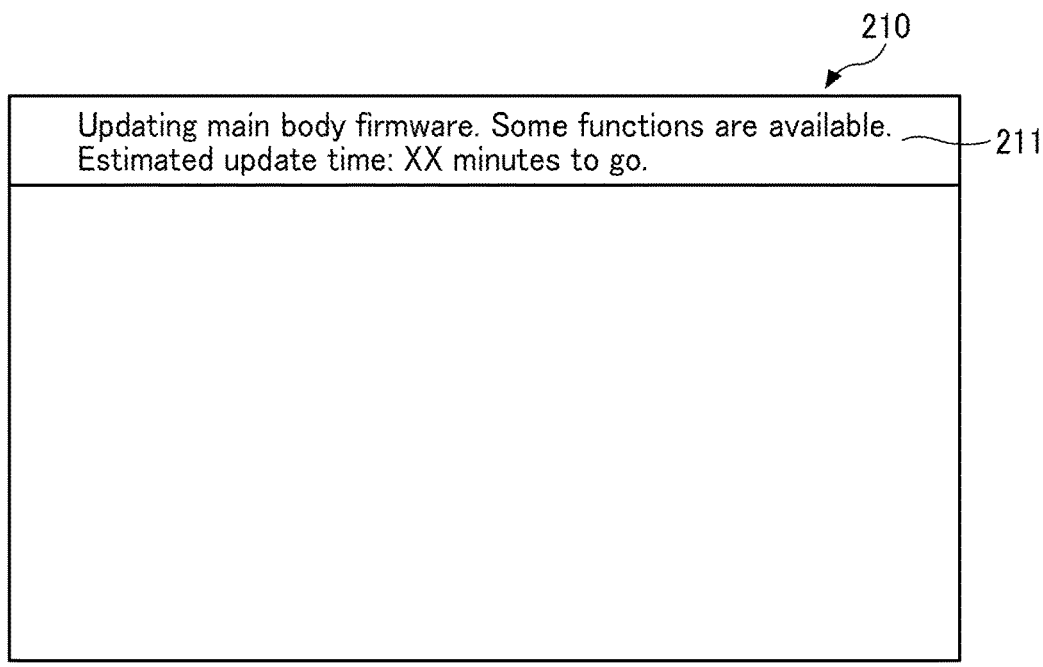
FIG. 9 is a diagram illustrating an example of an update banner screen displayed during the firmware update of the controller.

Examples of screens displayed by the operation device 110 regarding the firmware update are described with reference to FIGS. 9 to 12. FIG. 9 is a diagram illustrating an example of the update banner screen 210 displayed during the firmware update in the controller 100. The display control unit 24 displays the update banner screen 210 in response to the update start notification received by the operation device 110 from the controller 100. The update banner screen 210 is displayed at a location difficult to hinder the user's operation, such as at the top or bottom of the display panel 110a. A message 211 such as "Updating main body firmware. Some functions are available. Estimated update time: XX minutes to go." is displayed in a form of the banner. From the message 211, the user sees that the firmware of the main body is being updated and that some functions are available. For example, the display control unit 24 may automatically, or in response to a user's operation, display an available function even while the controller 100 is updating the firmware.

Also, the expected update time is the remaining time until the update of the firmware of the controller 100 is completed. The operation device 110 notifies the user of the remaining time since the user is able to use the operation device 110 for the functions that do not use the functions of the controller 100, even while the firmware of the operation device 110 is being updated. The first update control unit 11 is preferred to notify the operation device 110 of the expected update time in step S5 of FIG. 5. For example, the first update control unit 11 converts the size (number of bytes) of the firmware of the controller 100 into the expected update time and notifies the update time to the operation device 110. The display control unit 24 repeatedly subtracts the elapsed time from the expected update time to update "Estimated update time: XX minutes to go."

Figure 10:
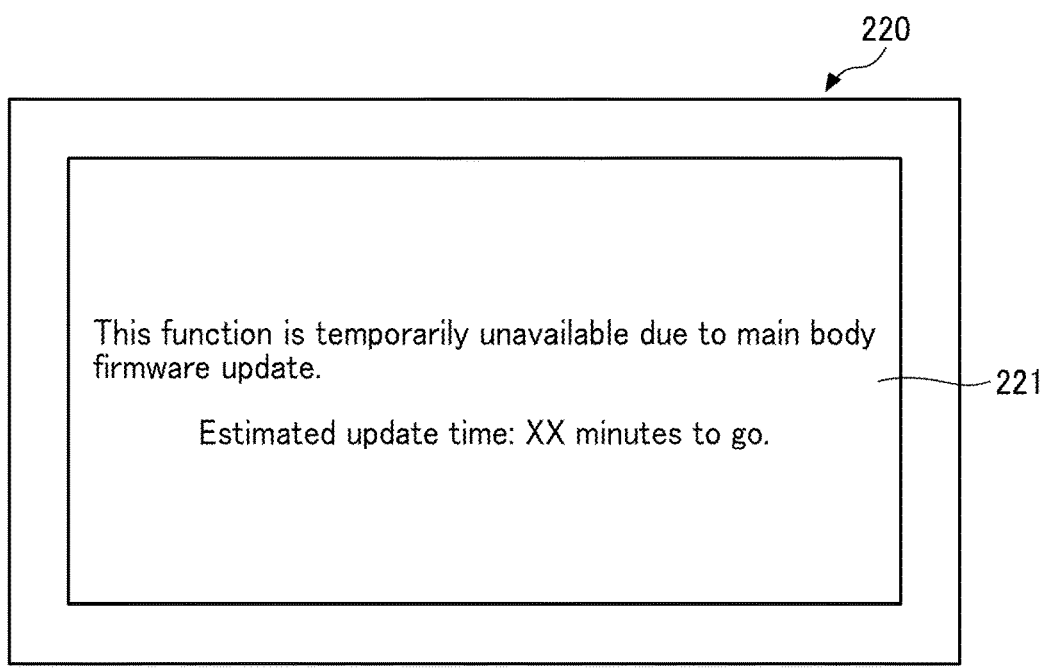
FIG. 10 is a diagram illustrating an example of a function restriction notification screen for notifying limitation of a function displayed by a display control unit in a case a user inputs through the operation device operation that is restricted while the firmware of the controller is being updated.

FIG. 10 is a diagram illustrating an example of the function restriction notification screen 220 displayed by the display control unit 24 in a case the user inputs through the operation device 110, an operation that is not available while the firmware of the controller 100 is being updated. The function restriction notification screen 220 displays a message 221 such as "This function is temporarily unavailable due to main body firmware update. Estimated update time: XX minutes to go." From the message 221 the user sees that a previously operated function is not available. For example, the display control unit 24 may automatically, or in response to a user's operation, display an available function even while the controller 100 is updating the firmware.

Figure 11:
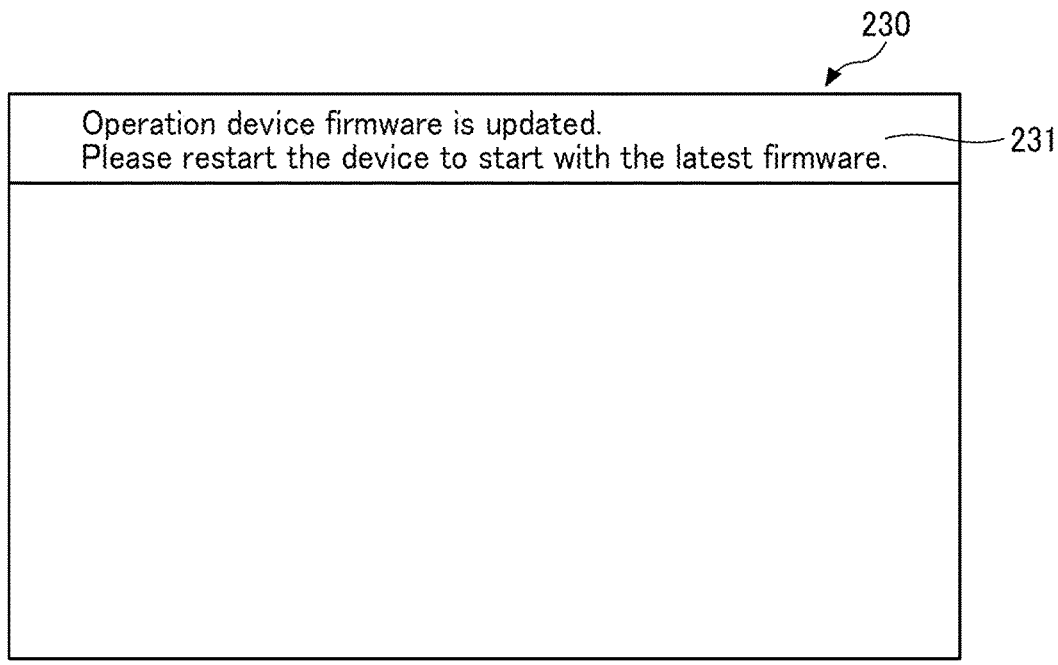
FIG. 11 is a diagram illustrating an example of an update completion notification screen for notifying completion of the firmware update displayed by the display control unit in response to the completion of the firmware update of the operation device.

FIG. 11 is a diagram illustrating an example of an update completion notification screen 230 notifying completion of the firmware update displayed by the display control unit 24 in response to the completion of the firmware update of the operation device 110. The update completion notification screen 230 is displayed at a location difficult to hinder the user's operation, such as at the top or bottom of the display panel 110a. A message 231 such as "Operation device firmware is updated. Please restart the device to start with the latest firmware." is displayed in the form of the banner.

From the message 231, the user sees that the operation device 110 should be restarted. The restart may be executed by pressing either a reset button of the operation device 110 or turning the power off and on of the operation device 110. Further, the restart may be executed by turning off and on the power of the image forming apparatus 200, or by pressing the reset button of the main body of the image forming apparatus 200 (however, this procedure is not possible while the firmware of the controller 100 is being updated).

Figure 12:
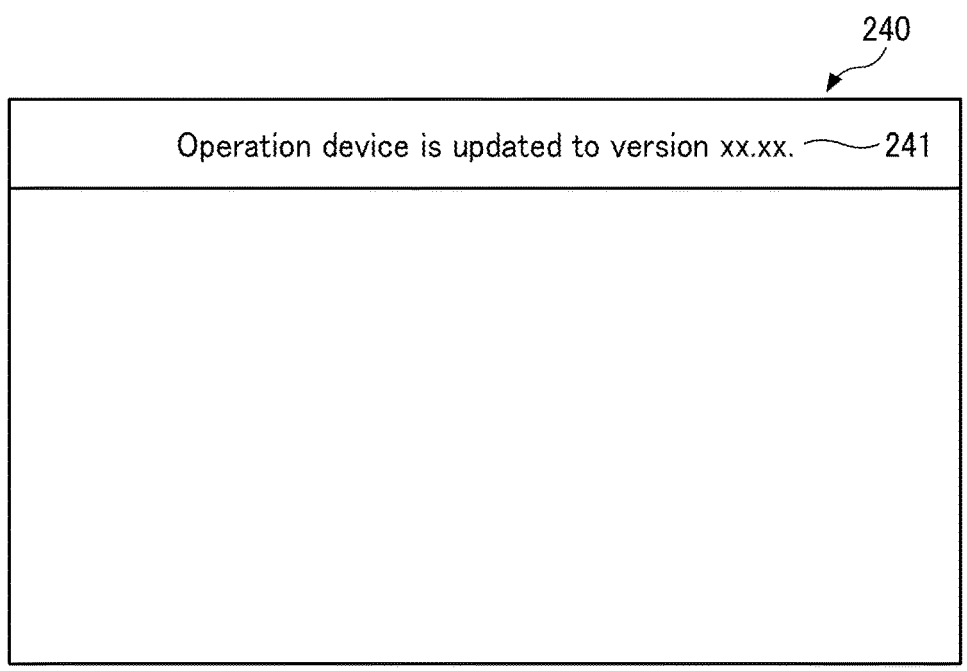
FIG. 12 is a diagram illustrating an example of an update completion restart screen displayed by the display control unit after the operation device is restarted.

FIG. 12 is a diagram illustrating an example of the update completion restart screen 240 displayed by the display control unit 24 after the operation device 110 is restarted. The update completion restart screen 240 is displayed at the location difficult to hinder the user's operation, such as at the top or bottom of the display panel 110a. A message 241 such as "Operation device is updated to version xx.xx." is displayed in a form of the banner. From the message 241 the user sees that the firmware of the operation device 110 is updated and the updated version.

Although the version of the firmware of the operation device 110 is displayed in FIG. 12, the version of the firmware of the controller 100 may be displayed in addition.

As described above, in the image forming apparatus 200 of the present embodiment, since the operation device 110 stores the log of the operation device 110 in the eMMC 120 while the controller 100 is updating the firmware, the logs of user operations received during the update of the controller 100 and malfunctions of the operation device 110 are stored.

Although the best mode for carrying out the present disclosure has been described using the examples described above, the present disclosure is not limited to these examples, and various modifications and substitutions can be made without departing from the scope of the present disclosure.

In the present embodiment, the image forming apparatus (image processing apparatus) is mainly used as the information processing apparatus for updating the firmware, but the information processing apparatus is not limited to the image forming apparatus. The information processing apparatus includes, for example, a projector (PJ), an electronic whiteboard (a whiteboard having an electronic blackboard function), an output device such as a digital signage, a head up display (HUD) device, an industrial machine, an imaging device, a sound collecting device, a medical device, a network appliance, an automobile (connected car), a notebook PC, a mobile phone, a smart phone, a tablet terminal, a game machine, a personal digital assistant (PDA), a digital camera, a wearable PC, a desktop PC, and the like may be used. For the devices described above, an output may be an output that matches the characteristics of the device, such as content display.

Also, in the present embodiment, the user copies the firmware to the image forming apparatus 200, but the image forming apparatus 200 may automatically download the firmware from the network.

Further, in the present embodiment, the controller 100 transfers the application and firmware to the operation device 110, but the operation device 110 may download the firmware separately from the controller 100 from the network.

Further, the example of configuration illustrated in FIG. 3 and the like are divided according to main functions in order to facilitate understanding of processing by the image forming apparatus 200. The present disclosure is not limited by the method and name of division of processing units. The processing of the image forming apparatus 200 can also be divided into more processing units according to the processing content. Further, one process may be divided to include a larger number of processes.

Aspects of the present disclosure are, for example, as follows.

According to a first aspect, an information processing apparatus includes a controller and an operation device, the controller includes a first update unit for updating firmware of the controller and the operation device includes a second update unit for updating firmware of the operation device while the operation device is in operation and a log storing unit for storing a log related to the operation device while the first update unit is updating the firmware of the controller.

According to a second aspect, in the information processing apparatus of the first aspect, the first update unit and the second update unit update the respective firmware in parallel at least a part of time.

According to a third aspect, in the information processing apparatus of the first aspect or the second aspect, the operation device further includes a log transmission unit for transmitting the log stored by the log storing unit to the controller after the first update unit completes updating the firmware of the controller, and the controller further includes a log reception unit for receiving the log from the operation device and for storing the log in chronological order together with the log of the controller.

According to a fourth aspect, in the information processing apparatus of the third aspect, the log storing unit stores the log in the operation device while the first update unit is updating the firmware of the controller and the log storing unit does not store the log in the operation device and the log transmission unit transmits the log to the controller while the first update unit is not updating the firmware of the controller.

According to a fifth aspect, in the information processing apparatus of any one of the first aspect to the fourth aspect, the log storing unit deletes the oldest record in the log or overwrites the oldest record in the log with a new record, in a case size of the log stored in the operation device reaches or exceeds a threshold.

According to a sixth aspect, in the information processing apparatus of the third aspect or the fourth aspect, the controller further includes a notification unit for notifying the operation device of a start and completion of the firmware update executed by the controller, and the log storing unit determines whether the first update unit is updating the firmware of the controller in response to the notification of the start and completion of the firmware update.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising a controller and an operation device,
    the controller including:
    circuitry configured to update firmware of the controller, and the operation device including:
    circuitry configured to: update firmware of the operation device while the operation device is in operation;
    store in one or more memories of the operation device, a log related to an event that occurs in the operation device while the firmware of the controller is in an update process;
    in response to an occurrence of the event, determine whether the firmware of the controller is in the update process;
    in response to determination that the firmware of the controller is in the update process, transmit the log, stored in the one or more memories of the operation device, to the controller after the update process of the firmware of the controller is completed;
    and in response to determination that the firmware of the controller is not in the update process, transmit the log related to the event that occurs in the operation device to the controller.

2. The information processing apparatus of claim 1, wherein
    the circuitry of the controller and the circuitry of the operation device are configured to update respective firmware of the controller and the operation device in parallel at least a part of time.

3. The information processing apparatus of claim 1, wherein
    the circuitry of the controller is further configured to receive the log related to the event that occurs in the operation device from the operation device and store in one or more memories of the controller, the log received from the operation device in a chronological order together with a log of the controller.

4. The information processing apparatus of claim 1, wherein
    the circuitry of the operation device is further configured to delete an oldest record in the log stored in the one or more memories of the operation device or overwrite the oldest record in the log stored in the one or more memories of the operation device with a new record, in a case in which a total data size of the log stored in the one or more memories of the operation device reaches or exceeds a threshold.

5. The information processing apparatus of claim 3, wherein
    the circuitry of the controller is further configured to notify the operation device of a start and completion of the firmware update executed by the controller, and
    the circuitry of the operation device is further configured to determine whether the controller is updating the firmware of the controller, based on the notification of the start and completion of the firmware update.

6. The information processing apparatus of claim 1, wherein the circuitry of the operation device is further configured to:
- activate one of a first firmware or a second firmware;
- in response to receiving a notification that the update process of the firmware of the controller has started while the first firmware is activated, update the second firmware in background; and
- in response to a restart of the operation device after the second firmware is updated, activate the second firmware.

7. The information processing apparatus of claim 1, wherein the circuitry of the operation device is further configured to:
- receive an update start notification from the controller in a case in which the update process of the firmware of the controller is started, and an update completion notification from the controller in a case in which the update process of the firmware of the controller is completed;
- in response to receiving the update start notification, determine that the firmware of the controller is in the update process;
- and in response to receiving the update completion notification, determine that the firmware of the controller is not in the update process.

8. A log storage method executed by an information processing apparatus comprising a controller and an operation device, the method comprising:
- with the controller, updating firmware of the controller;
- with the operation device, updating firmware of the operation device while the operation device is in operation;
- with the operation device, storing a log related to an event that occurs in the operation device while the firmware of the controller is in an update process;
- in response to an occurrence of the event, with the operation device, determining whether the firmware of the controller is in the update process;
- in response to determination that the firmware of the controller is in the update process, transmitting the log, stored in the one or more memories of the operation device, to the controller after the update process of the firmware of the controller is completed; and
- in response to determination that the firmware of the controller is not in the update process, transmitting the log related to the event that occurs in the operation device from the operation device to the controller.

9. A non-transitory recording medium storing a plurality of instructions which, when executed by one or more processors on an information processing apparatus comprising a controller and an operation device, cause the processors to perform a log storage method, including:
- with the controller, updating firmware of the controller;
- with the operation device, updating firmware of the operation device while the operation device is in operation;
- with the operation device, storing a log related to an event that occurs in the operation device while the firmware of the controller is in an update process;
- in response to an occurrence of the event, with the operation device, determining whether the firmware of the controller is in the update process;
- in response to determination that the firmware of the controller is in the update process, transmitting the log, stored in the one or more memories of the operation device, to the controller after the update process of the firmware of the controller is completed;
- and in response to determination that the firmware of the controller is not in the update process, transmitting the log related to the event that occurs in the operation device from the operation device to the controller.

* * * * *